United States Patent [19]

Yahagi

[11] Patent Number: 5,438,609
[45] Date of Patent: Aug. 1, 1995

[54] MOBILE COMMUNICATION METHOD FOR COMPLETING CALLS UTILIZING A MOBILITY MANAGER AND SYSTEM THEREFOR

[75] Inventor: Masahiko Yahagi, Tokyo, Japan
[73] Assignee: NEC Corporation, Tokyo, Japan
[21] Appl. No.: 246,349
[22] Filed: May 19, 1994

[30] Foreign Application Priority Data

May 19, 1993 [JP] Japan .................................. 5-117085

[51] Int. Cl.[6] ........................ H04Q 7/22; H04M 11/00
[52] U.S. Cl. ......................................... 379/58; 379/59; 379/60; 379/63; 455/33.1; 455/54.1
[58] Field of Search ....................... 379/58, 59, 60, 63, 379/57; 455/33.1, 33.2, 54.1, 54.2, 56.1

[56] References Cited

U.S. PATENT DOCUMENTS

| | | | |
|---|---|---|---|
| 5,259,017 | 11/1993 | Langmantel | 379/58 |
| 5,260,987 | 11/1993 | Mauger | 379/60 |
| 5,274,694 | 12/1993 | Lechner et al. | 379/63 |
| 5,333,178 | 7/1994 | Norell | 379/60 |

OTHER PUBLICATIONS

"Signaling Architecture in Digital Mobile Communications Network" The Transactions of the Institute of Electronics, Information and Communication Engineers, Nov. 1990, vol. J73-B-II, No. 11, pp. 571-584.
"Automatic Pursuit Routing Method in Mobile Communications Network" The Transactions of the Institute of Electronics, Information and Communication Engineers, May 1989, vol. J72-B-11, No. 5, pp. 191-200.
"System and Network Technologies" Technologies for Supporting Digital Automobile Telephones The Transactions of the Institute of Electronics, Information and Communication Engineers, Aug. 1990, vol. 73, No. 8, pp. 812-818.

*Primary Examiner*—Curtis Kuntz
*Assistant Examiner*—William Trost
*Attorney, Agent, or Firm*—Ostrolenk, Faber, Gerb & Soffen

[57] ABSTRACT

In a mobile communication method, when a terminating call is generated to a mobile station, position information about the mobile station as a called party and a mobile station identification number for paging the mobile station as the called party are retrieved on the basis of a mobile station terminating dial number from a station as a calling party. A local switch located in a local service area corresponding to a position indicated by the retrieved position information is determined. One subscriber line dial number, to which terminating connection is to be performed, is selected from subscriber line dial numbers of a plurality of subscriber lines connected to the determined local switch. The selected subscriber line dial number is stored in correspondence with the retrieved mobile station identification number. A subscriber line indicated by the subscriber line dial number stored in correspondence with the mobile station identification number is reserved. The terminating call is connected to the reserved subscriber line. The mobile station as the called party is paged in accordance with the mobile station identification number stored in correspondence with the subscriber line to which the terminating call is connected. A mobile communication system is also disclosed.

13 Claims, 6 Drawing Sheets

MOBILE COMMUNICATION METHOD FOR COMPLETING CALLS UTILIZING A MOBILITY MANAGER AND SYSTEM THEREFOR

BACKGROUND OF THE INVENTION

The present invention relates to a mobile communication method and system and, more particularly, to call connection of mobile stations.

In a conventional mobile communication system of this type, a unit having a call connection function for mobile stations is connected to a unit of a rank equivalent to that of a transit switch to realize call connection of the mobile stations, as disclosed in "Signaling Architecture in Digital Mobile Communications Network" (THE TRANSACTIONS OF THE INSTITUTE OF ELECTRONICS, INFORMATION AND COMMUNICATION ENGINEERS, 1990/11, Vol. J73-B-II, No. 11, pp. 571–584 (to be referred to as reference 1 hereinafter)), "Automatic Pursuit Routing Method in Mobile Communications Network" (THE TRANSACTIONS OF THE INSTITUTE OF ELECTRONICS, INFORMATION AND COMMUNICATION ENGINEERS, 1989/5, Vol. J72-B-11, No. 5, pp. 191–200 (to be referred to as reference 2 hereinafter)), and "System and Network Technologies" ("Technologies for Supporting Digital Automobile Telephones", THE TRANSACTIONS OF THE INSTITUTE OF ELECTRONICS, INFORMATION AND COMMUNICATION ENGINEERS, 1990/8, Vol. 73, No. 8, pp. 812–818 (to be referred to as reference 3 hereinafter)).

Figure 6:
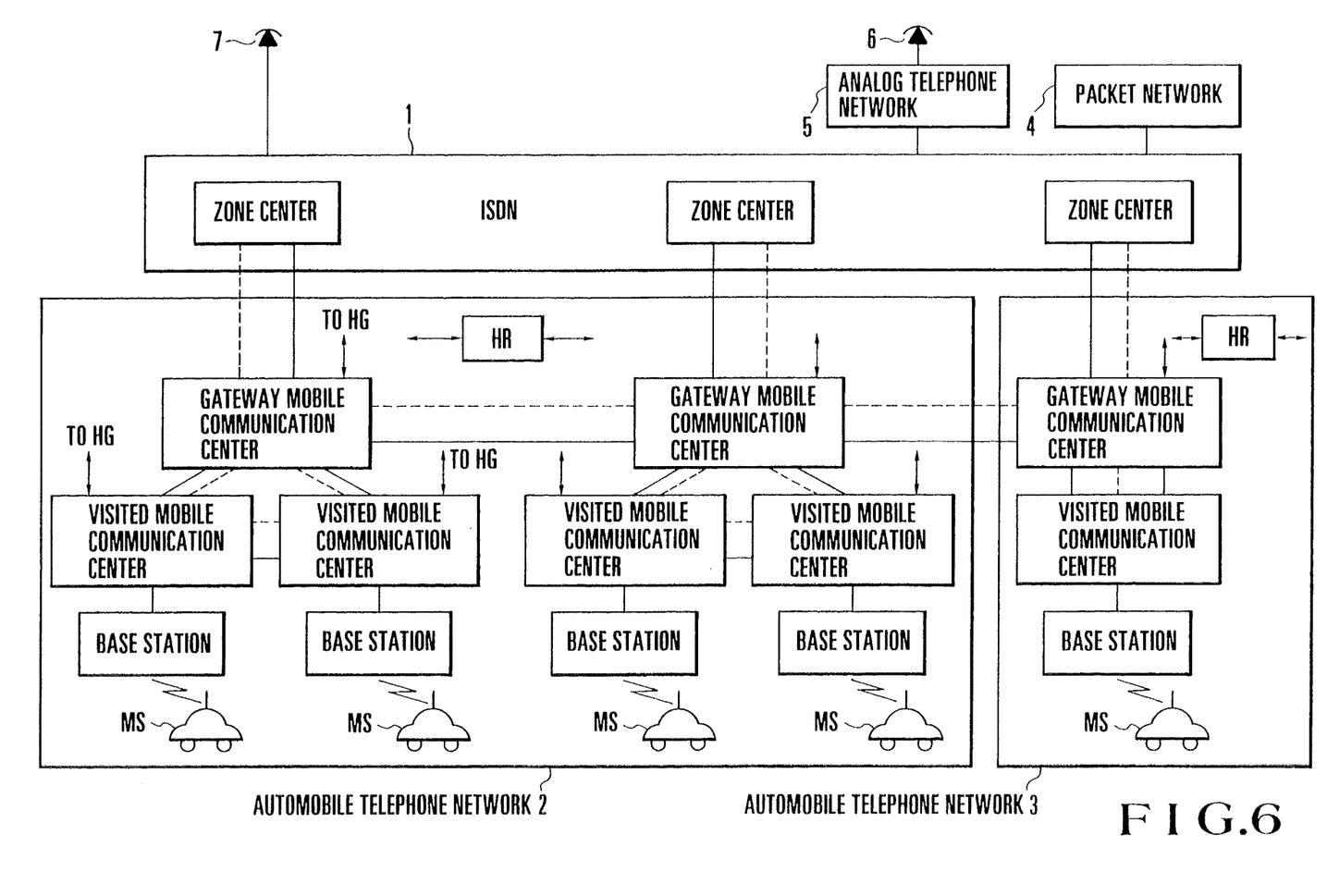
FIG. 6 is a block diagram showing connection between units in the network architecture of a conventional automobile telephone system.

FIG. 6 shows the network architecture of the conventional digital automobile telephone system disclosed in reference 3. Referring to FIG. 6, reference numeral 1 denotes an ISDN (Integrated Service Digital Network) having zone centers ZC; and 2 and 3, automobile telephone networks for performing call connection of mobile stations MS. Each of the automobile telephone networks is connected to a corresponding zone center ZC and constituted by a gateway mobile communication center (to be referred to as a gateway center hereinafter) G-MCC having gate and transit functions with respect to the ISDN 1, a home memory center HR in which the numbers and visited areas of mobile stations MS are registered, a visited mobile communication center (to be referred to as a visited center hereinafter) V-MCC having visited area management and station connection functions, and a radio base station BS for transmitting/receiving signals to/from the mobile stations MS. Reference numeral 4 denotes a packet network connected to the ISDN 1; 5, an analog telephone network connected to the ISDN 1; and 6 and 7, station telephone sets respectively connected to the analog telephone network and the ISDN 1. Call connection between switching systems such as the gateway centers G-MCC and the visited centers V-MCC is performed by a switching system protocol of the common channel signaling system indicated by the dotted lines in FIG. 6, in which a control signal path is separated from communication paths. According to the terminating protocol disclosed in reference 2, terminating connection to the mobile station MS is performed through the following procedure.

Upon detection of a terminating call to the mobile station MS, the gateway center G-MCC inquiries of the home memory center HR as to the visited center V-MCC which accommodates the visited radio zone of the mobile station MS, and outputs a call set message IAM to the corresponding visited center V-MCC via a public communication network, thereby performing connection to the visited center. This call set message IAM is different from an address signal IAM for call connection in a fixed communication network. In a digital mobile communication network, according to reference 1, the call set message IAM must be a signal corresponding to the following functions:

1. a routing function based on an intra-network routing number (RN),
(2) a retention/transfer function for a terminating dial number,
(3) an inter-node retention/transfer function for mobile station data such as a subscriber class and mobile station class,
(4) a transfer function for intrinsic intra-mobile-communication-network numbers such as a base station number and a radio channel number, and
(5) a backward channel setting function required for any other zone selection/channel switching.

In the above-described conventional mobile communication system, a signal transmitted/received between a center unit equivalent to the visited center V-MCC, in which the mobile station is located, and a center unit equivalent to the gateway center G-MCC based on the conventional techniques and designed to perform connection processing with respect to a commercial public telephone network is unique to the mobile network. For this reason, each of the units equivalent to the visited center V-MCC and the gateway center G-MCC needs to have functions different from those of a unit, i.e., a switching system, used in a public telephone network. Therefore, in order to realize a mobile communication function, a mobile telephone network different from a commercial public telephone network is required.

SUMMARY OF THE INVENTION

It is an object of the present invention to provide a mobile communication method and system which do not require any communication network different from a commercial public telephone network.

In order to achieve the above object, according to the present invention, there is provided a mobile communication method comprising the steps of when a terminating call is generated to a mobile station, retrieving position information about the mobile station as a called party and a mobile station identification number for paging the mobile station as the called party on the basis of a mobile station terminating dial number from a station as a calling party, determining a local switch located in a local service area corresponding to a position indicated by the retrieved position information, selecting one subscriber line dial number, to which terminating connection is to be performed, from subscriber line dial numbers of a plurality of subscriber lines connected to the determined local switch, storing the selected subscriber line dial number in correspondence with the retrieved mobile station identification number, reserving a subscriber line indicated by the subscriber line dial number stored in correspondence with the mobile station identification number, connecting the terminating call to the reserved subscriber line, and paging the mobile station as the called party in accordance with the mobile station identification number stored in correspondence with the subscriber line to which the terminating call is connected.

DESCRIPTION OF THE PREFERRED EMBODIMENTS

Embodiments of the present invention will be described below with reference to the accompanying drawings.

Figure 1:
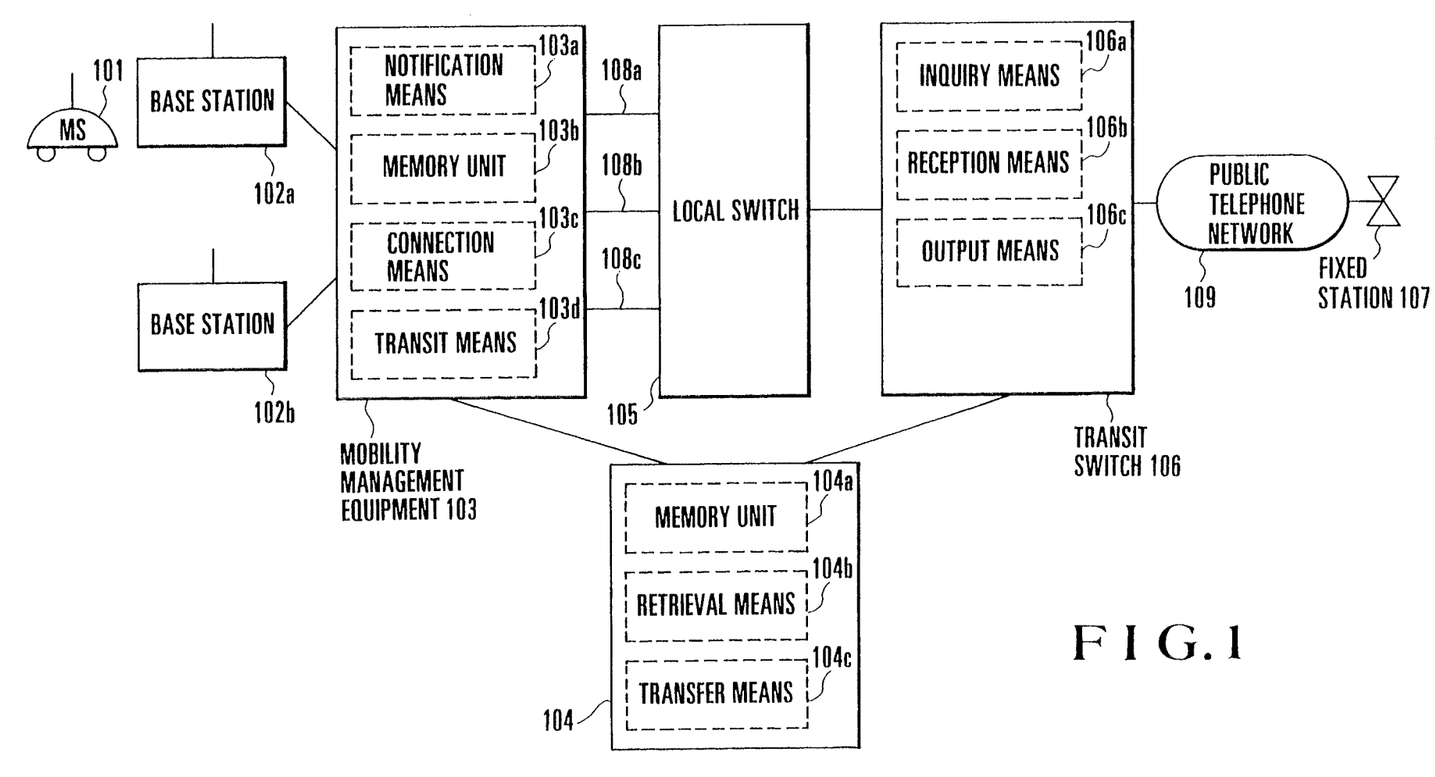
FIG. 1 is a block diagram showing the arrangement of a mobile communication system according to the first embodiment of the present invention.

FIG. 1 shows the arrangement of a mobile communication system according to the first embodiment of the present invention.

A mobile station (MS) 101 has a function of establishing communication with base stations (BSs) 102a and 102b by radio communication. The base stations 102a and 102b are connected to a mobility management equipment (MME) 103. In addition to the base stations 102a and 102b, the mobility management equipment 103 is connected to a mobile station database (MDB) 104 and a local switch (LS) 105 of a public telephone network. Subscriber lines 108a, 108b, and 108c of the local switch 105 are connected between the mobility management equipment 103 and the local switch 105. LS line terminating dial numbers defined in the local switch 105 are respectively assigned to the subscriber lines 108a, 108b, and 108c. By designating one of these LS line terminating dial numbers from the fixed network side, the local switch 105 can perform connection of the local switch 105 through the same procedure as that for a terminating call to a general fixed station.

The local switch 105 is connected to a transit switch (TS) 106. The local switch 105 transfers the MS terminating dial number of the mobile station 101 to the transit switch 106 in advance to prepare for a terminating call to the mobile station 101.

The transit switch 106 is connected to the mobile station database 104 and has the following function. The transit switch 106 outputs the terminating dial number of the mobile station 101 to the mobile station database 104, and receives a terminating dial number as a response from the mobile station database 104, which dial number is assigned to one of the subscriber lines 108a to 108c of the local switch 105 in a local service area in which the mobile station 101 is located. Upon reception of this terminating dial number, the transit switch 106 determines the route of call connection in accordance with the LS line terminating dial number designating one of the subscriber lines 108a to 108c, and outputs a numerical signal. In this embodiment, the transit switch 106 includes a gateway mobile communication center.

Note that the gateway mobile communication center may be arranged in the local switch 105.

Reference numeral 109 denotes a public telephone network in which a fixed station 107 is accommodated, and has a function of performing connection with other public switched networks (not shown).

The detailed arrangements of the transit switch 106, the mobile station database 104, and the mobility management equipment 103 will be described next. The transit switch 106 comprises an inquiry means 106a, a reception means 106b, and an output means 106c. The inquiry means 106a inquiries of the mobile station database 104 as to a terminating station dial number including a mobile station terminating dial number from a subscriber as a calling party, when a terminating call is generated to the mobile station 101. The reception means 106b receives the station dial number assigned to the subscriber line 108b between the mobility management equipment 103 and the local switch 105 in the local service area in which the mobile station 101 notified as a called party by the mobile station database 104 visits. The output means 10bc outputs, to the local switch 105, a numerical signal for selecting the subscriber line 108b corresponding to the received station dial number.

The mobile station database 104 comprises a memory means 104a, a retrieval means 104b, and a transfer means 104c. The memory means 104a holds mobile station data associated with the mobile station 101 and position information received from the mobile station 101. The retrieval means 104b accesses the memory means 104a in accordance with an inquiry made by the transit switch 106 to determine the mobility management equipment 103 connected to the subscriber lines 108a to 108c of the local switch 105 in the local service area, in which the mobile station 101 as the called party visits, on the basis of the received mobile station terminating dial number and also read out a mobile station identification number for paging the mobile station 101 corresponding to the mobile station dial number. The transfer means 104c inquires of the determined mobility management equipment 103 as to a station dial number corresponding to the subscriber line 108b for connecting the terminating call and including the mobile station identification number read for the determined mobile management equipment 103, and transfers the station dial number corresponding to the subscriber line 108b to be connected, received from the mobility management equipment 103, to the transit switch 106.

The mobility management equipment 103 comprises a notification means 103a, a memory unit 103b, a connection means 103c, and a transit means 103d. The notification means 103a notifies the station dial number corresponding to the subscriber line 108b in an idle state in response to an inquiry from the mobile station database 104. The memory unit 103b stores the notified station dial number corresponding to the subscriber line 108b and the received mobile station identification number in correspondence with each other. When a terminating call is generated with respect to the subscriber line 108b corresponding to the station dial number stored in the memory unit 103b, the connection means 103c performs a paging operation corresponding to the mobile station identification number, read out from the memory unit 103b, via the base station in the local service area, and captures the mobile station 101 as the called party from which a response is received, thereby connecting the subscriber line 108b to which the terminating call is generated. Upon detection of an originating call from the mobile station 101 in the local service area via the base station 102a, the transit means 103d checks the validity of the originating call on the basis of the station dial number of the mobile station 101, which has generated the originating call, and the mobile station data held in the memory means 104a, and connects the originating call to the subscriber line 108b in an idle state.

Figure 2:
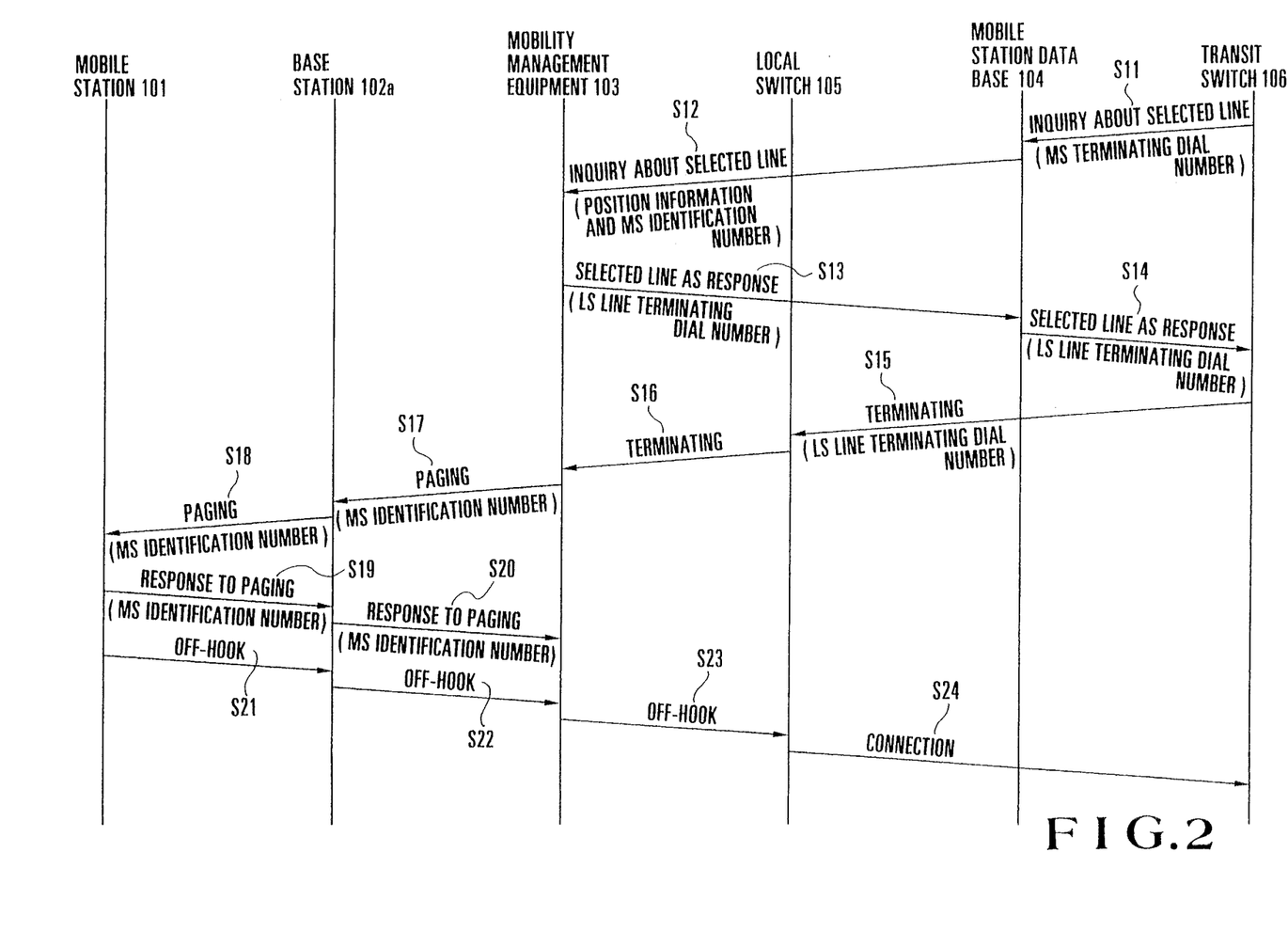
FIG. 2 is a chart showing a terminating connection sequence for a mobile station in the mobile communication system shown in FIG. 1.

FIG. 2 shows a terminating connection sequence in which the transit switch 106 performs terminating connection with respect to the mobile station 101 in the mobile communication system shown in FIG. 1.

The transit switch 106 analyzes a received terminating telephone number on the basis of an MS terminating dial number transferred from the local switch 105 in advance. If it is determined that the terminating station is a mobile station, the transit switch 106 inquires of the mobile station database 104 as to a terminating station dial number upon notification of the MS terminating dial number (step S11). By using the MS terminating dial number from the transit switch 106 as a parameter, the mobile station database 104 reads out position information constituted by local service area information from the retrieval means 104b together with an MS identification number for paging the mobile station 101. The mobile station database 104 then determines the mobility management equipment 103 connected to the local switch 105 in the local service area, in which the mobile station 101 as the called party visits, on the basis of the read position information, outputs the read MS identification number to the determined mobility management equipment 103, and makes an inquiry about the station dial number of a terminating station to be connected (step S12).

Upon reception of a station dial number inquiry signal from the mobile station database 104, the mobility management equipment 103 captures the subscriber line 108b in an idle state, located between the mobility management equipment 103 and the local switch 105, and informs the mobile station database 104 of the corresponding information as an LS line terminating dial number (step S13). In addition, the mobility management equipment 103 stores the information indicating the subscriber line 108b in the memory unit 103b in correspondence with the MS identification number received from the mobile station database 104, thus holding/reserving the captured subscriber line 108b. The mobile station database 104 notifies the transit switch 106 of the LS line terminating dial number received from the mobility management equipment 103 (step S14).

Upon reception of the LS line terminating dial number from the mobile station database 104, the transit switch 106 sends, to the local switch 105, a numerical signal for connecting the terminating call to the subscriber line 108b indicated by the LS line terminating dial number, and connects the held terminating call to the reserved subscriber line 108b (step 15).

When the terminating call is connected to the subscriber line 108b of the mobility management equipment 103 via the local switch 105 by the operation in step S15 (step S16), the mobility management equipment 103 outputs, to the base station 102a, a paging signal with the MS identification number as a parameter, which is stored in the memory unit 103b in correspondence with the subscriber line 108b (step S17). Upon reception of the paging signal, the base station 102a performs a paging operation in accordance with the MS identification number included in the received paging signal, and sends the MS identification number to the mobile station 101 (step S18).

When the mobile station 101 is located within the area of the base station 102a, the mobile station 101 receives and recognizes its own MS identification number, and returns the MS identification number as a response to the paging operation to the mobility management equipment 103 via the base station 102a (steps S19 and S20). When the mobile station 101 performs an off-hook operation, an off-hook signal is sent to the base station 102a (step S21). The base station 102a receives the off-hook signal and transfers it to the mobility management equipment 103 (step S22).

Upon reception of the off-hook signal, the mobility management equipment 103 sends an off-hook signal to the local switch 105 (step S23). With this operation, the local switch 105 performs line connection (step S24). As a result, the mobile station 101 is connected to the fixed station 107, which has generated the originating call, via the transit switch 106, thus performing speech communication.

Figure 3:
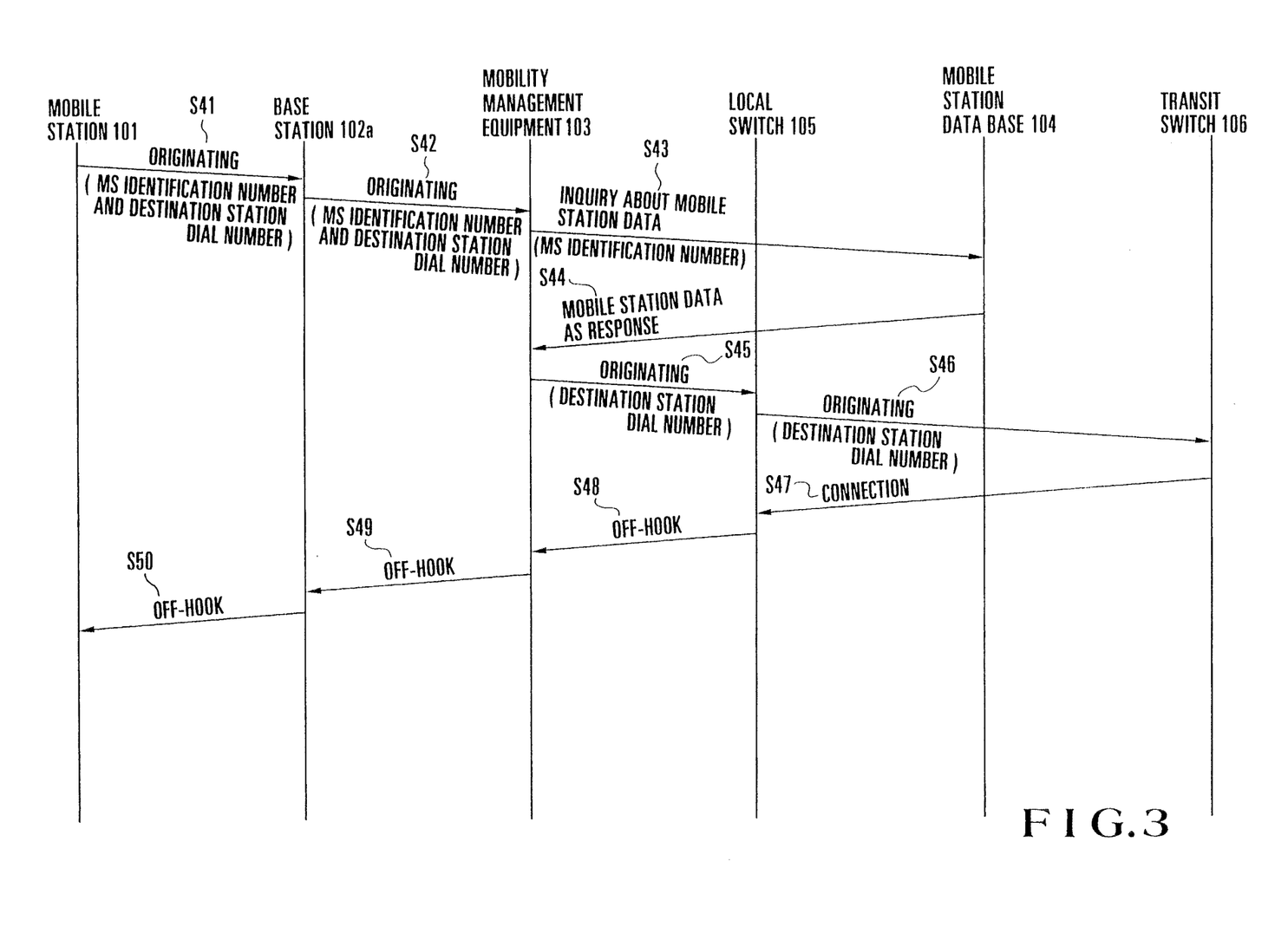
FIG. 3 is a chart showing an originating connection sequence for a mobile station in the mobile communication system shown in FIG. 1.

FIG. 3 shows an originating connection sequence in which the mobile station 101 generates an originating call in the arrangement shown in FIG. 1.

When the mobile station 101 performs an off-hook operation to generate an originating call, the mobile station 101 sends its own MS identification number and the destination station dial number, as parameters of an originating signal, to the mobility management equipment 103 via the base station 102a (steps S41 and S42). Upon reception of the originating signal, the mobility management equipment 103 transmits an inquiry signal having the received MS identification number as a parameter to the mobile station database 104 to inquiry the MS data of the mobile station 101 (step S43).

The mobile station database 104 retrieves the MS data corresponding to the mobile station 101 of the MS identification number included in the inquiry signal from the memory means 104a, and sends a signal having the MS data as a parameter to the mobility management equipment 103 (step S44).

The mobility management equipment 103 checks the validity of the originating call in accordance with the mobile station database on the parameter signal from the mobile station database 104, captures the subscriber line 108b, of the local switch 105, which is in an idle state, and sends the destination station dial number to the local switch 105 (step S45).

The local switch 105 sends the destination station dial number to the transit switch 106 (step S46). When the destination station dial number corresponds to a fixed station, the local switch 105 performs a terminating operation by general telephone switching connection. When the destination station dial number corresponds to a mobile station, a terminating operation is performed in accordance with the same line connection sequence as that described above. After a connection to the local switch 105 based on an off-hook operation of the destination station (step S47), an answer signal is notified from the local switch 105 to the mobile station 101 via the mobility management equipment 103, and the base station 102a (steps S48 to S50).

Figure 4:
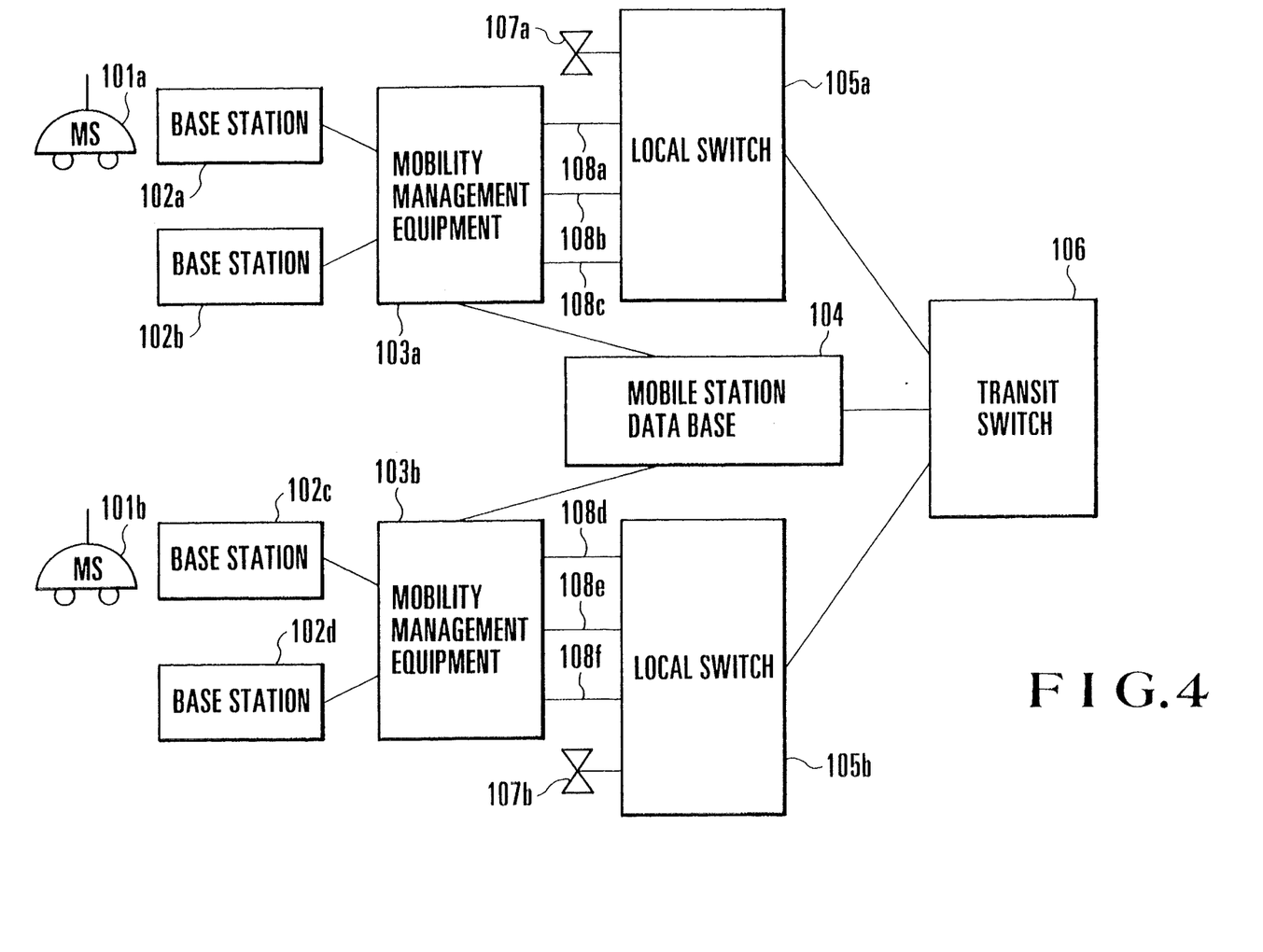
FIG. 4 is a block diagram showing the arrangement of a mobile communication system according to the second embodiment of the present invention.

FIG. 4 shows the arrangement of a mobile communication system according to the second embodiment of the present invention, which comprises a plurality of local switches 105a and 105b and a plurality of mobility management equipments 103a and 103b. Referring to FIG. 4, the local switches 105a and 105b to which fixed stations 107a and 107b are connected are connected to a transit switch 106. In addition, a mobile station database 104 is connected to the mobility management equipments 103a and 103b respectively connected to the local switches 105a and 105b and to the transit switch 106. Reference numerals 101a and 101b denote mobile stations; 102a to 102d, base stations; and 108a to 108f, subscriber lines.

Figure 5:
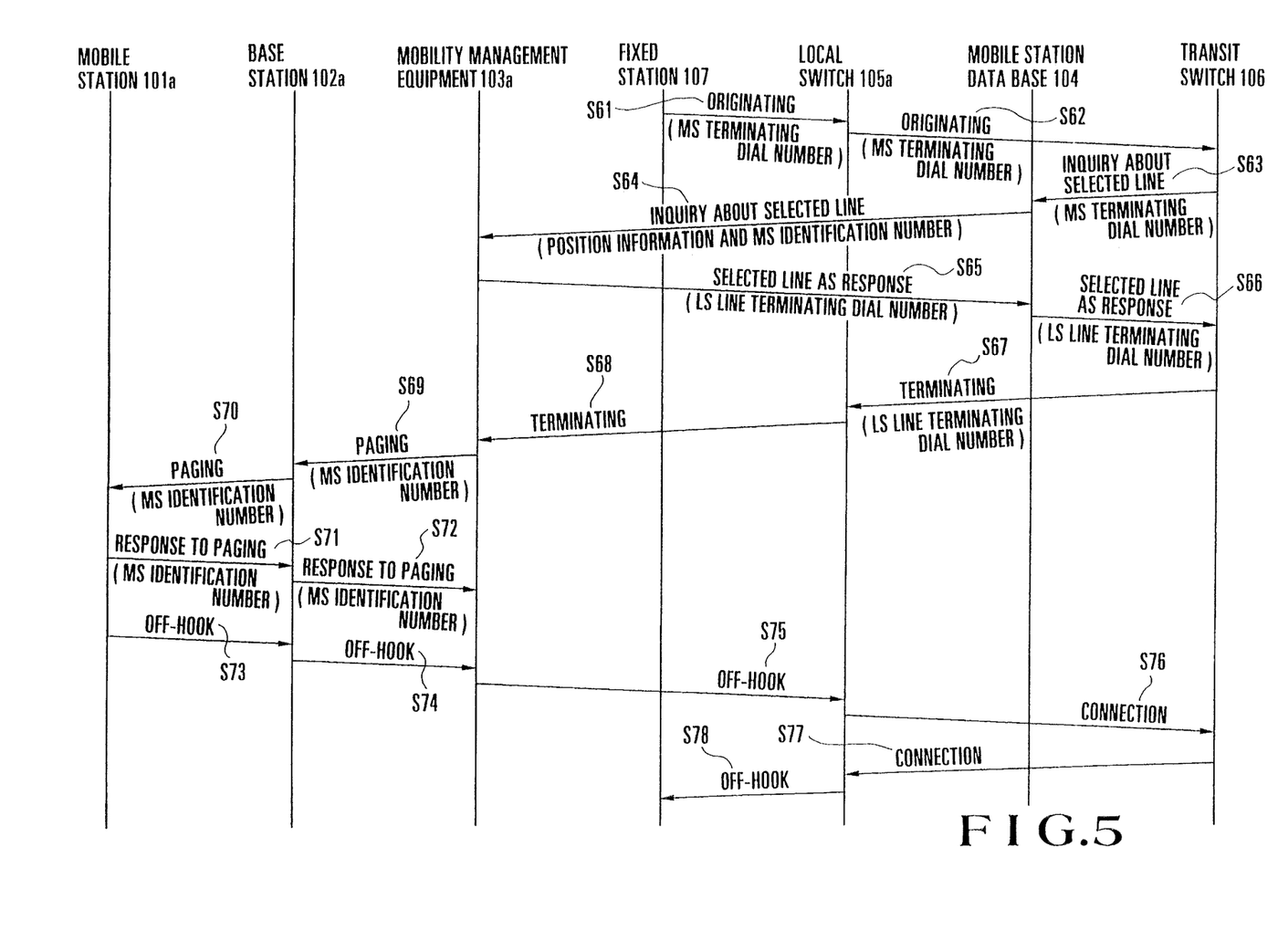
FIG. 5 is a chart showing a terminating connection sequence for a mobile station in the mobile communication system shown in FIG. 4.

In the mobile communication system having the above arrangement, when the fixed station 107a performs an originating operation, as shown in FIG. 5, the fixed station 107a sends the MS terminating dial number of the mobile station 101a as a called party to the local switch 105a (step S61). Upon determining that the received MS terminating dial number is originated for the mobile station 101a, the local switch 105a transfers the MS terminating dial number to the transit switch 106 (step S62). The transit switch 106 receives an answer signal based on the off-hook operation of the mobile station 101a in steps S63 to S76 similar to steps S11 to S24 shown in FIG. 2, and sends the received response signal to the fixed station 107a via the local switch 105a (steps S77 and S78).

AS has been described above, according to the present invention, a gateway mobile communication center notifies, in advance, call set data unique to mobile communication to a mobility management equipment of a local switch in a local service area via a mobile station database. When only a call set signal similar to the one used for connection in a fixed telephone switching network is output, the gateway mobile communication center is connected to the corresponding mobility management equipment. Upon a termination operation, the mobility management equipment captures a mobile station as a called party and connects the terminating call on the basis of the call set data of the mobile station notified in advance. With this operation, a call set signal IAM sent to a commercial telephone network becomes the same as a signal IAM for a fixed communication network. Therefore, no switching control protocol and switching function specially designed for a mobile communication system are required between a local switch and a transit switch. Hence, an economical mobile communication system can be realized.

What is claimed is:

1. A mobile communication method comprising the steps of:

when a terminating call is generated to a mobile station, retrieving position information about said mobile station as a called party and a mobile station identification number for paging said mobile station as the called party on the basis of a mobile station terminating dial number from a station as a calling party;

determining a local switch located in a local service area corresponding to a position indicated by the retrieved position information;

selecting one subscriber line dial number, to which terminating connection is to be performed, from subscriber line dial numbers of a plurality of subscriber lines connected to said determined local switch;

storing the selected subscriber line dial number in correspondence with the retrieved mobile station identification number;

reserving a subscriber line indicated by the subscriber line dial number stored in correspondence with the mobile station identification number;

connecting the terminating call to the reserved subscriber line; and paging said mobile station as the called party in accordance with the mobile station identification number stored in correspondence with the subscriber line to which the terminating call is connected.

2. A method according to claim 1, wherein the retrieving step comprises the steps of inquiring of a mobile station database having a memory unit for storing a mobile station identification number and position information about a mobile station, supplied from a gateway mobile communication center from which a terminating call is generated, as to a station dial number of a terminating station to which the terminating call is to be connected, and causing said mobile station database to which the inquiry is made to refer to said memory unit and read out local service area information of said mobile station as the called party and a mobile station identification number in accordance with a mobile station terminating dial number.

3. A method according to claim 2, wherein the selecting step comprises the steps of inquiring of a mobility management equipment connected to a local switch selected by said mobile station database as to a station dial number of a terminating dial number of a terminating station, and selecting one idle subscriber line connected to said local switch selected by said mobility management equipment to connect the terminating call to said mobile station.

4. A method according to claim 3, wherein the storing step comprises the step of storing the retrieved mobile station identification number in said memory unit of said mobility management equipment in correspondence with the selected subscriber line.

5. A method according to claim 3, wherein the reserving step comprises the step of reserving one idle subscriber line after the subscriber line is captured by said mobility management equipment.

6. A method according to claim 3, wherein the step of connecting the terminating call comprises the steps of sending a reserved subscriber line dial number from said mobility management equipment to said gateway mobile communication center via said mobile station database, sending a numerical signal for selecting the reserved subscriber line from said gateway mobile communication center to said local switch, and causing said local switch to connect the terminating call to the reserved subscriber line on the basis of the received numerical signal.

7. A method according to claim 3, wherein the step of paging said mobile station comprises the steps of sending a paging signal to said mobile station on the basis of the mobile station identification number stored in a memory unit of said mobility management equipment in correspondence with the reserved subscriber line, and receiving a response signal from said mobile station to connect the terminating call to said mobile station as the called party.

8. A mobility communication system comprising:
a mobile station;
a plurality of base stations for performing radio communication with said mobile station;

a mobility management equipment, connected to said base stations, for performing management of said mobile station;

a local switch, connected to said mobility management equipment via a plurality of subscriber lines, for performing switching connection of a terminating call to said mobile station by connecting one of the subscriber lines in accordance with a received numerical signal;

a mobile station database connected between a gateway mobile communication center and said mobility management equipment; and said gateway mobile communication center for, when a terminating call is generated to said mobile station, setting line connection to a local switch in a local service area, in which said mobile station as a called party visits, on the basis of a mobile station terminating dial number from a subscriber as a calling party, wherein said gateway mobile communication center includes inquiry means for inquiring of said mobile station database as to a terminating station dial number including a mobile station terminating dial number when a terminating call is generated to said mobile station, reception means for receiving the station dial number notified by said mobile station database and assigned to an idle subscriber line between said mobility management equipment and said local switch in a local service area in which said mobile station as the called party visits, and output means for outputting a numerical signal for selecting a subscriber line corresponding to the received station dial number to said local switch, said mobile station database includes a first memory unit for holding mobile station data associated with said mobile station and position information received from said mobile station, retrieval means for accessing said first memory unit in accordance with a inquiry from said gateway mobile communication center to determine said mobility management equipment connected to a subscriber line of a local switch in a local service area, in which said mobile station as the called party visits, on the basis of a received mobile station terminating dial number, and reading out a mobile station identification number for paging said mobile station corresponding to the mobile station dial number, and transfer means for inquiring of said determined mobility management equipment as to a station dial number corresponding to a subscriber line to which the terminating call is to be connected and including the read mobility station identification number, and transferring the station dial number of the subscriber line to be connected, received from said mobility management equipment, to said gateway mobile communication center, and said mobility management equipment includes notification means for notifying a station dial number of an idle subscriber line in response to an inquiry from said mobile station database, a second memory unit for storing the notified station dial number of the subscriber line and the received mobile station identification number in correspondence with each other, and connection means for, when a terminating call is generated to the subscriber line corresponding to the station dial number stored in said second memory unit, performing a paging operation based on the mobile station identification number read out from said second memory unit through said base station in the local service area, capturing said mobile station as the called party from which a response is returned, and connecting the subscriber line to which the terminating call is generated.

9. A system according to claim 8, wherein said mobility management equipment comprises transit means for, when an originating call from said mobile station in the local service area is detected via said base station, checking validity of the originating call on the basis of a station dial number of said mobile station, which has generated the originating call, and mobile station data held in said first memory unit of said mobile station database, and connecting the originating call to an idle subscriber line.

10. A system according to claim 8, wherein said gateway mobile communication center is arranged in a transit switch constituting a public communication network.

11. A system according to claim 8, wherein said gateway mobile communication center is arranged in said local switch constituting a public communication network.

12. A system according to claim 8, further comprising a plurality of switching stations, each constituted by a pair of said local switch and said mobility management equipment, and wherein said mobile station database is separately arranged for each of said switching stations.

13. A system according to claim 8, further comprising a plurality of switching stations, each constituted by a pair of said local switch and said mobility management equipment, and wherein said mobile station database is commonly arranged for said switching stations.

* * * * *